United States Patent [19]

Aichholzer

[11] 4,074,214

[45] Feb. 14, 1978

[54] MICROWAVE FILTER

[75] Inventor: Ronald Albert Aichholzer, Chicago, Ill.

[73] Assignee: Motorola, Inc., Schaumburg, Ill.

[21] Appl. No.: 724,501

[22] Filed: Sept. 20, 1976

[51] Int. Cl.[2] .......................... H01P 1/20; H01P 7/00; H04B 1/26; H01P 3/08

[52] U.S. Cl. .................................. 333/73 S; 325/446; 333/35; 333/82 R; 333/84 M; 363/158

[58] Field of Search ................. 333/73 S, 73 R, 84 R, 333/84 M, 73 C, 76, 73 W, 97 R, 82 R, 82 A, 82 B, 35, 96, 33; 331/96-102, 43; 325/445-447, 436-438, 473-474, 477, 460, 489, 388; 321/60, 69 R, DIG. 1, 69 W, 69 NL; 329/160, 162

[56] References Cited

U.S. PATENT DOCUMENTS

| | | | |
|---|---|---|---|
| 2,915,716 | 12/1959 | Hattersley | 333/97 X |
| 3,437,935 | 4/1969 | Webb | 325/446 |
| 3,497,835 | 2/1970 | Tsuda | 333/84 M X |
| 3,659,206 | 4/1972 | Hallford | 325/446 |
| 3,662,294 | 5/1972 | Jacobs et al. | 321/69 W X |
| 3,737,815 | 6/1973 | Low et al. | 333/84 M |
| 3,870,960 | 3/1975 | Hallford et al. | 325/446 |
| 3,943,450 | 3/1976 | Otremba | 325/446 |

*Primary Examiner*—Alfred E. Smith
*Assistant Examiner*—Marvin Nussbaum
*Attorney, Agent, or Firm*—James P. Hamley; James W. Gillman

[57] ABSTRACT

A precisely controlled bandpass/bandstop filter is fabricated by coupling open circuit stubs to a transmission line. The first and second stubs are designed to resonate with the third stub at the center frequency of the passband. Both the first and third stubs are one quarter wavelength long at the center frequency of the stopband, thereby attenuating transmission line signals within this band. The second stub is of a predetermined dimension to attenuate signals at a flyback frequency which occurs within the stopband as a result of interreaction between the stubs.

In a particular application, the filter may be used to significantly enhance the signal to noise characteristic of the mixer portion of a radio receiver.

10 Claims, 6 Drawing Figures

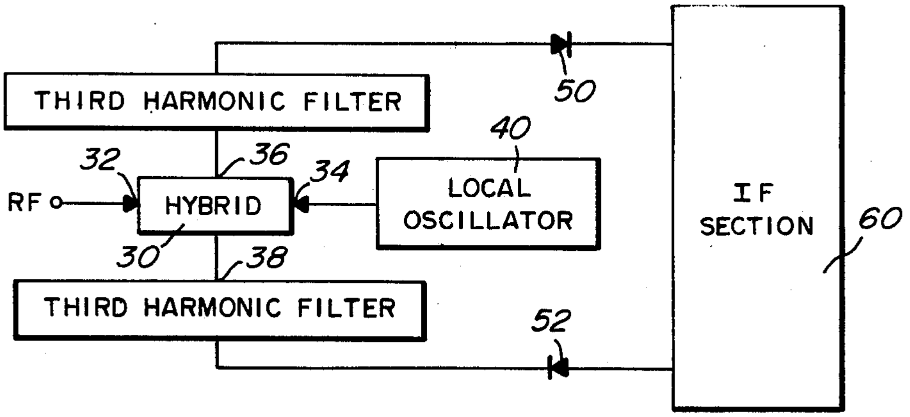
FIG. 5
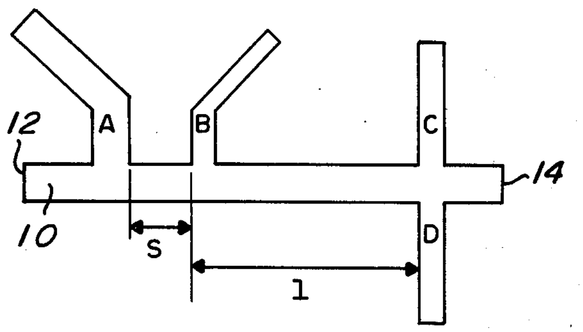
FIG. 1
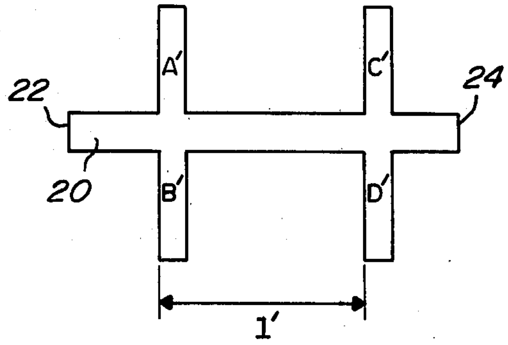
FIG. 2
FIG. 3
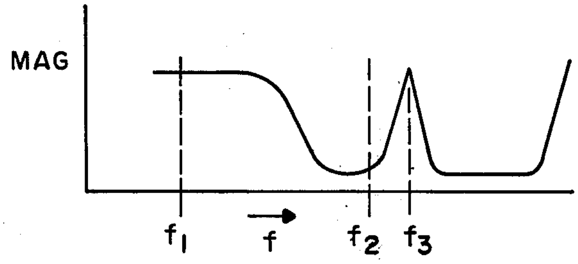
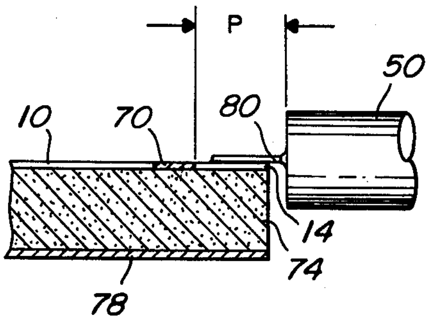
FIG. 6
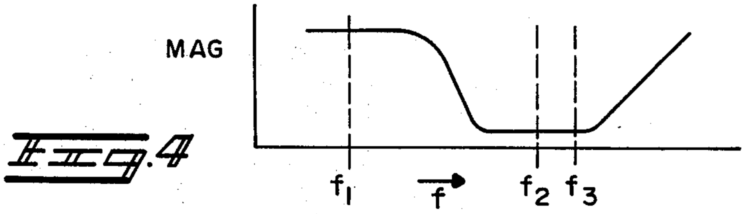
FIG. 4

MICROWAVE FILTER

BACKGROUND OF THE INVENTION

The present invention relates to the signal processing art and, in particular, to a high frequency bandstop/-bandpass filter.

Considerable research has been conducted, especially by those in the communication field, into the high frequency filtering of electromagnetic radiation. Conventional designs for high frequency filters include a transmission line to which is coupled one or more open or short circuit stubs. By controlling the electrical length of, and spacing between, stubs the resulting filter provides a desired impedance characteristic as a function of input signal frequency. Both microstrip and strip line fabrication of such microwave stub type filters are well known in the art.

Prior art microwave filter designs which provide both a passband and a stopband characteristic have suffered from a significant defect. Namely, interreactions between various stubs can result in a "flyback" resonance within the stopband, thereby degrading the attenuation characteristics within this band. In some applications the flyback characteristic may be tolerated but, in general, there is a need in the high frequency filtering art for providing a means to suppress the flyback frequency phenomenon.

A need has arisen in the radio frequency mixer art to develop a high frequency bandpass/bandstop filter which does not display a flyback characteristic. There, incoming radio frequency signals are coupled with local oscillator signals in a conventional hybrid coupler. The hybrid coupler output in turn feeds the diodes of a balanced mixer which, in turn, feeds to an intermediate frequency stage. It has been found that the signal to noise ratio of the front end may be significantly enhanced if a filter having a controlled bandstop characteristic at the third harmonic of the local oscillator frequency is placed between the hybrid coupler and each of the mixer diodes. The bandstop characteristic of the filter must, of course, be complemented by a controlled bandpass characteristic at the fundamental of the local oscillator frequency. Due to the aforementioned flyback phenomenon, conventional mixers have suffered a signal to noise degradation since the signals at the flyback frequency have not been filtered prior to application to the mixer diodes.

SUMMARY OF THE INVENTION

It is an object of this invention, therefore, to provide an improved high frequency bandpass/bandstop filter which does not display degradation of its attenuation characteristic due to a flyback phenomenon.

It is a particular object of the invention to provide the above described filter for use in the mixer portion of a radio receiver to enhance the signal to noise ratio thereof.

Briefly, according to the invention, the bandpass-/bandstop filter is comprised of a central transmission line which has an input terminal for receiving signals and output terminal for reproducing the filtered input signals. First, second and third stubs are predeterminedly located with respect to the transmission line and with respect to each other. The stubs are of predetermined dimension such that the first and second stubs resonate with the third stub at the center frequency of the desired passband. At least one of the first and second stubs is designed to attenuate those transmission line signals having a frequency at near the center frequency of the stopband. The third stub is designed to attenuate those transmission line signals at the flyback frequency, which flyback frequency is created by an interreaction between the stubs.

The filter is particularly suited for application in a radio receiver whereby an RF signal is modulated by a local oscillator through a diode balanced mixer. By designing the passband of the filter to pass both the local oscillator signal and the receiver RF signal, the stopband to attenuate signals at the third harmonic of the local oscillator, and by placing the diode one quarter wavelength from the third stub, the third harmonic local oscillator suppression prior to the diode results in a significantly enhanced signal to noise ratio of the tuner.

BRIEF DESCRIPTION OF THE DRAWINGS

FIG. 1 illustrates a preferred embodiment of the transmission line filter according to the invention;

FIG. 2 illustrates an alternate embodiment of the inventive transmission line filter;

FIG. 3 is a frequency response plot of the prior art high frequency bandpass/bandstop filter;

FIG. 4 is a frequency response plot of the waveguide filter according to the invention;

FIG. 5 illustrates application of the inventive waveguide filter in the mixer section of a radio receiver; and FIG. 6 is a cutaway view of a microstrip construction of the inventive filter when used in the circuit of FIG. 5.

DETAILED DESCRIPTION OF THE PREFERRED EMBODIMENT OF THE INVENTION

FIG. 1 is a diagram illustrating the preferred construction of the transmission line filter when fabricated using microstrip or stripline techniques. As is well known in the art, both of the aforementioned techniques employs a metallic center conductor which is bounded on one or both sides by dielectric insulation and metallic ground planes.

The filter comprises a transmission line section 10, made of conductive material such as a deposited metal on a dielectric slab (shown in FIG. 6), and is provided with an input terminal 12 and an output terminal 14. High frequency signals, such as of the radio frequency (RF) type, are applied from a signal source (not shown) to the input 12, and pass down the transmission line 10 being reproduced, after filtering, at the output terminal 14. Shown electrically coupled to the transmission line 10 are a plurality of stubs designated as A through D, inclusive. As is well known in the art, the physical dimensions and relative placement of the stubs with respect to the transmission line 10 effect the input impedance seen by a source at the input terminal 12 and thereby may be used to frequency tailor a desired filter response. In the preferred embodiment of the invention a passband/stopband filter is required.

The passband characteristic is realized by constructing stubs A and B to resonate with stubs C and D at the center frequency of the passband. This is accomplished by controlling the distance 1 such that the combined susceptance of stubs A and B, when transformed the electrical distance 1, is equal in magnitude but opposite in sign to the combined susceptance of stubs C and D. Thus, the input impedance at terminal 12 for signals within the passband, centered about the center frequency, is primarily a small real value.

The bandstop characteristic is realized by constructing stubs A, C and D with an electrical length of one quarter wavelength at the center frequency of the stopband. As is quite familiar to those in the microwave art, a one quarter wavelength stub exhibits the characteristic of impedance inversion. In this case, for signals at the frequency corresponding to the one quarter wavelength of the stub, each stub will produce at the transmission line an inversion of the impedance at its other end. Since the stubs are open circuited, the inverted impedance results in a short at the transmission line for those frequencies corresponding to the stub one quarter wavelength. Thus, stubs A, C and D produce shorts at the transmission line for signals at or near the center frequency of the stopband.

It should be clear to one of ordinary skill in the microwave filtering art that stub D is not required for successful operation of the filter. That is, the desired passband could be generated by the first three stubs, i.e. A, B and C, and the desired stopband characteristic could be realized with only stubs A and C. The function of the one quarter stub D, which has exactly the same dimensions as stub C and is connected at the transmission line 10 in approximately the same point, is to provide additional attenuation in the stopband and effectively halve the impedance on the transmission line at its output terminal 14.

Without stub B, an interreaction might develop between the remaining stubs to create a "flyback" frequency in the stopband. A flyback frequency is a form of a resonance which can significantly degrade the attenuation characteristics of the stopband. The flyback frequency is normally created at a harmonic of the center frequency of the passband. Thus, a flyback within the stopband is most often found for stopbands which include frequencies at harmonics of the center frequency of the passband.

FIG. 3 is a plot of the magnitude of signals passing through prior art passband/stopband filters as a function of input frequency. Here it is assumed that $f_1$ is the center frequency of the passband, with $f_2$ being the center frequency of the stopband. Due to an interreaction between the stubs, a flyback frequency $f3$ is generated, which can be seen to significantly degrade the stopband attenuation characteristic.

Referring again to FIG. 1, the instant invention avoids the undesired flyback frequency by inclusion of stub B. The stub is selected to have an electrical length of one quater the wavelength of the flyback frequency. Thus, stub B creates a short on the transmission line for those transmission line signals having a frequency at or very near the flyback frequency.

FIG. 4 illustrates the magnitude versus frequency response plot of the filter of FIG. 1, thus illustrating suppression of a response at the flyback frequency, due to the short created by stub B.

It should also be clear to one of ordinary skill in the art that characteristic impedances of the transmission line 10, and the stubs may be chosen to suit a particular application. Also, it should be noted that to avoid coupling between stubs A and B, these stubs may be separated by a distance s and formed to bend away from each other, as shown in FIG. 1.

FIG. 2 illustrates an alternate embodiment of the improved waveguide filter. Here, as with the embodiment of FIG. 1, a plurality of four stubs A′ through D′ are coupled to a transmission line 20 having an input terminal 22 and an output terminal 24. The physical dimension and placement of stubs A′ and B′ is such that they resonate with stubs C′ and D′ at the center frequency of the desired passband. Thus, as before, the combined susceptance of stubs A′ and B′, when rotated the distance 1′, exactly cancels the combined susceptance of stubs C′ and D′ at the desired frequency. This results in the filter presenting a small, real input impedance to source signals which are at or near the resonant frequency of the stubs. Stubs A′, C′ and D′ are selected to be one quarter wavelength at the center frequency of the desired passband, thus providing the attenuation thereat, as is discussed with reference to FIG. 1. Also as aforementioned, stub D′ is not required to realize the fundamental passband/stopband characteristic, but is included to provide further attenuation in the stopband and to lower the impedance at the output terminal 24 of the transmission line 20.

Without stub B′, a flyback frequency within the stopband might be created by interreaction between stubs A′, C′ and D′. Thus, as in FIG. 1, the dimensions of stub B′ are predeterminedly selected such that it has an electrical length of one quarter wavelength at the flyback frequency, whereby the magnitude response plot of FIG. 4 applies equally to the embodiment of FIG. 2.

Comparing the embodiment of FIG. 1 to that of FIG. 2, the filter of FIG. 1 has the advantage that space is available beneath stubs A and B for additional structure, such as an additional filter. An advantage to the embodiment of FIG. 2 is that it may be constructed such that all stubs have the same characteristic impedance and, therefore, it is easier to determine the interstub spacing 1′ required to create resonance at the desired passband center frequency.

FIG. 5 illustrates an application of the inventive filter in the mixer section of a radio frequency receiver. Here, RF signals, as may be picked up by an antenna, are applied to a first input 32 of a hybrid coupler 30. The hybrid coupler has a second input 34 and first and second outputs 36, 38, respectively. Acting in the conventional manner, the hybrid splits signals at its input terminals 32, 34 into two signals of one half the magnitude and applies these signals to its output terminals 36, 38. In the present application, a local oscillator signal 40 is applied to the hybrid second input 34, such that one half the RF input signal and one half the local oscillator signal appear at both hybrid output terminals 36, 38. Another feature of the hybrid 30 is that the relative phase of the signals at the output terminals 36, 38 may be predeterminedly controlled. In the present example, the signals appearing at the output terminals 36 are 180° out of phase with those appearing at output terminal 38.

In conventional tuners the hybrid output terminal signals are then fed to the two matched diodes 50, 52 comprising a diode balanced mixer. The diodes in turn couple to the intermediate frequency (IF) section 60 for further processing.

It has been found that the signal to noise ratio of the mixer can be significantly enhanced if the third harmonic of the local oscillator frequency is filtered out before application to the diodes 50, 52. Thus, the present invention contemplates designing a passband/stopband filter, such as of the type shown in FIGS. 1 and 2, to pass those frequencies at or near both the fundamental of the local oscillator and within the band of received RF signals but to attenuate those signals at the third harmonic thereof.

In a particular application, the local oscillator fundamental frequency is 1.85 gigahertz, and the desired characteristic impedance of the transmission line is 50 ohms. It was found that excellent passband/stopband characteristics for the filter of FIG. 1 were realized by making stub A with a characteristic impedance of 42 ohms and with an electrical length of one quarter wavelength at 5.55 gigahertz. Stubs C and D were designed to have a characteristic of 58 ohms, also having an electrical length of one quarter wavelength at 5.55 gigahertz. With a spacing s of approximately 0.1 inch, the length 1 required to cause resonance at 1.85 gigahertz, and to produce a broad passband characteristic, was designated to be approximately 0.176 of a wavelength at 2.0 gigahertz. To suppress signals on the transmission line at the flyback frequency, stub B was designed to be one quarter wavelength at 5.28 gigahertz with a characteristic impedance of 58 ohms.

It should be clear to anyone of ordinary skill in the microwave art that the characteristic impedance of a line is a function of its width, and of its capacitance to theground plane, which capacitance is a function of both the dielectric interspaced material and the spacing dimension to the ground plane.

FIG. 6 is a cross sectional view illustrating microstrip construction of the filter of FIG. 1 for use in the circuit of FIG. 5. Shown in a side view of the transmission line 10 with stub D projecting therefrom, out of the figure, at a point 70. On one side of the transmission line is found a dielectric layer 74 which, in turn, is terminated at conductive ground plane 78. A partial view is shown of one of the balanced mixer diodes 50 which has an end terminal 80 connected to the end terminal 14 of the strip line 10. Since the stubs C and D are one quarter wavelength at the third harmonic of the local oscillator frequency, a short circuit to frequencies at the third harmonic appears at the juncture of the aforementioned stubs. By attaching the mixer diode 50 a distance p, which is equal to approximately one quarter wavelength at the third harmonic oscillator frequency, the short at the junction of stubs C and D is rotated as an open, or very high impedance, at the diode 50, for signals at the oscillator third harmonic frequency. Thus, the combination provides very high attenuation at the oscillator third harmonic frequency, thereby realizing a substantial improvement in signal to noise ratio of the overall tuner.

In summary, an improved transmission line passband/stopband filter has been described which provides a means to eliminate a flyback frequency in the stopband. The filter has been discussed with respect to the mixer section of a radio receiver wherein it finds application for the enhancement of the tuner overall signal to noise ratio.

While a preferred embodiment of the invention has been described in detail, it should be understood that many modifications and variations thereto are possible, all of which fall within the true spirit and scope of the invention.

I claim:

1. A transmission line filter for passing signals having frequencies within a passband centered about a first predetermined frequency and attenuating signals having frequencies within a stopband centered about a second predetermined frequency, the filter comprising:

a central transmission line having an input terminal and an output terminal for receiving signals at its input terminal and passing the same to said output terminal; and first, second and third stubs, each stub of predetermined dimension and coupled to the transmission line at a predetermined location such that a. the first and second stubs resonate with the third stub at the first predetermined frequency, b. at least one of the first and third stubs attenuates transmission line signals having frequencies within the stopband, and c. the third stub attenuates transmission line signals at a flyback frequency, which flyback frequency is created within the stopband by an interreaction between the stubs.

2. The filter of claim 1 wherein at least one of the first and third stubs has an electrical length of one-quarter wavelength at the second predetermined frequency.

3. The filter of claim 1 wherein the third stub has an electrical length of one-quarter wavelength at the second predetermined frequency, the filter further comprising a fourth stub having an electrical length equal to that of the third stub and coupled to the transmission line at approximately the same point as the third stub whereby the fourth stub provides additional attenuation to transmission line signals within the stopband.

4. The filter of claim 1 wherein the second predetermined frequency is the third harmonic of the first predetermined frequency.

5. The filter of claim 1 fabricated using microstrip techniques.

6. In a radio receiver wherein an RF signal is modulated by a local oscillator and a balanced diode mixer to an intermediate frequency for application to an IF stage, a pair of third harmonic filters, each filter comprising:

a transmission line adapted for coupling the local oscillator signal and the received RF signal to each diode; and first, second and third stubs, each stub of predetermined dimension and coupled to the transmission line at a predetermined location such that a. the first and second stubs resonate with the third stub to create a passband for passing both the local oscillator and received RF frequency signals, b. at least one of the first and third stubs attenuates transmission line signals having frequencies within a stopband centered about the third harmonic of the local oscillator frequency, and c. the third stub attenuates transmission line signals at a flyback frequency, which flyback frequency is created within the stopband by an interreaction between the stubs.

7. The harmonic filters of claim 6 wherein the electrical distance between the stubs and each diode is predeterminedly fixed such that a high impedance is reflected by the filter to the diode at the third harmonic local oscillator frequency.

8. The harmonic filters of claim 6 wherein at least one of the first and third stubs has an electrical length of one-quarter wavelength at the third harmonic of the local oscillator frequency.

9. The filters of claim 6 wherein each third stub has an electrical length of one-quarter wavelength at the third harmonic of the local oscillator frequency, each filter further comprising a fourth stub having an electrical length equal to that of the third stub and coupled to the transmission line at approximately the same point as the third stub whereby the fourth stub provides additional attenuation to transmission line signals within the stopband.

10. The filters of claim 6 fabricated using microstrip techniques.

* * * * *